(12) United States Patent
Furnas et al.

(10) Patent No.: US 7,418,118 B2
(45) Date of Patent: Aug. 26, 2008

(54) METHOD AND APPARATUS FOR DIAGNOSING PATHOGENIC OR ALLERGENIC MICROORGANISMS OR MICROPARTICLES AT A REMOTE LOCATION

(76) Inventors: Steven J. Furnas, 3453 Cambridge Rd., Cameron Park, CA (US) 95682; Franklin Michael Beninsig, 400 Capitol Mall, SIPI - 11th Floor, Sacramento, CA (US) 95814

( * ) Notice: Subject to any disclaimer, the term of this patent is extended or adjusted under 35 U.S.C. 154(b) by 1340 days.

(21) Appl. No.: 09/917,112

(22) Filed: Jul. 27, 2001

(65) Prior Publication Data

US 2002/0058862 A1    May 16, 2002

Related U.S. Application Data

(60) Provisional application No. 60/247,186, filed on Nov. 10, 2000.

(51) Int. Cl.
*G06K 9/00*    (2006.01)
(52) U.S. Cl. ........................................ 382/128

(58) Field of Classification Search ............ 382/128, 382/133, 110; 434/295; 359/387; 600/160, 600/161–182
See application file for complete search history.

(56) References Cited

U.S. PATENT DOCUMENTS

| 4,736,826 | A | * | 4/1988 | White et al. | 191/12.2 A |
|---|---|---|---|---|---|
| 5,216,596 | A | | 6/1993 | Weinstein | 364/413.02 |
| 5,734,498 | A | * | 3/1998 | Krasieva et al. | 359/387 |
| 5,944,532 | A | * | 8/1999 | Lienhop | 434/295 |
| 6,014,451 | A | * | 1/2000 | Berry et al. | 382/110 |
| 6,101,265 | A | | 8/2000 | Bacus et al. | 382/133 |
| 6,106,457 | A | * | 8/2000 | Perkins et al. | 600/175 |
| 6,272,235 | B1 | * | 8/2001 | Bacus et al. | 382/133 |
| 6,711,283 | B1 | * | 3/2004 | Soenksen | 382/133 |

* cited by examiner

*Primary Examiner*—Tom Y. Lu
(74) *Attorney, Agent, or Firm*—Leland K Jordan (57) ABSTRACT

A system for on-site detection at remote locations of various microscopic contaminants in samples without requiring use of growth media or involving extensive testing methodologies. Electronic transmission of such digitized high-level resolution photomicrographs to a certified mycologist or other technically trained personnel for rapid analysis is provided.

8 Claims, 6 Drawing Sheets

FIG. 4 moldstill3.jpg moldstill4.jpg sti11II.jpg sti5II.jpg sti6II.jpg sti7II.jpg stil2I.jpg still.4bmp.jpg still.jpg still10.jpg still3.jpg still6.jpg still8.jpg still9.jpg stmmill.jpg

Fig. 5 algae-handheld.jpg asbestos-handheld.jpg bacteria2-handheld.jpg bacteria-handheld.jpg black oak pollen-handheld.jpg Blood1-handheld.jpg Fiberglass-handheld.jpg pollen1-handheld.jpg ragweed-handheld.jpg

Fig. 6

METHOD AND APPARATUS FOR DIAGNOSING PATHOGENIC OR ALLERGENIC MICROORGANISMS OR MICROPARTICLES AT A REMOTE LOCATION

REFERENCE TO PRIOR APPLICATION

This application claims benefit of U.S. Provisional application, Ser. No. 60/247,186, filed Nov. 10, 2000.

FIELD OF THE INVENTION

The present invention relates to digital-imaging microscopic examination of microscopic particles or microorganisms, such as fungi. More particularly, the present invention provides a high-intensity lighted digital image capture method having sufficient resolution so that microorganism images may be captured at a remote site and transmitted electronically to a laboratory where accurate and rapid identification of the microorganism may be accomplished by qualified personnel.

BACKGROUND OF THE INVENTION

Many biological organisms trigger allergic reactions, respiratory difficulties, and some types of asthma. Some molds release mycotoxins and metabolites that may cause respiratory or thermal discomfort. These spores are the reproductive units of fungi and their elimination has become a matter of importance in enhancing the general well-being of man.

A discussion of conventional techniques for microscopic examination of growth such as fungi is set forth at pages 180-181 of "Medically Important Fungi—A Guide to Identification" by Davise H. Larone (1987). Three most popular types of microscopic examination techniques include teasemount which is a rapid method but is destructive and does not always preserve the original position and structure of the conidia, spores and the like, both of which are extremely important to allow accurate identification. Cellophane tapemount is also a rapid method and uses tape to remove part of the growth before the fungi is placed on a small drop of LPCB on a glass slide and examined under a microscope. This method helps retain the original position of characteristic fungal structures. Slide culture techniques preserve the structure of a fungus in a slide culture; however these is not as rapid as other techniques since they require suspending a microscopic slide in a petri dish with a block of agar on top of the slide. Once the fungi have grown to a stage sufficient to permit proper identification, a slide culture is generally made from this initial culture. The slide culture generally consists of a square of agar medium which has been inoculated with a sample of the culture of the fungi initially made, and which has been placed upon a microscope slide with a cover glass on top of the culture on the slide. The slide culture is then generally incubated in a humid environment. After incubation, identification of the fungi is generally accomplished by removing the cover glass from the slide, placing the cover glass on another microscope slide on top of a drop of lactophenol cotton blue stain, and viewing the fungi under a microscope.

A problem with microscopic techniques is that they are dependent upon the individual expertise of the operator, thereby increasing the margin of error both in the over identification of fungi-false positives, and in the under identification of fungi-false negatives whenever the analysis is made by any person other than a certified mycologist.

U.S. Pat. No. 5,839,445 discloses a method of diagnosing a disease of a fingernail, a toenail, skin, or a mucus membrane using a confocal microscope to observe abnormal structures within the fingernail, the toenail, the skin, or the mucus membrane. The characteristics of those structures are compared to corresponding characteristic structures known to be associated with a given disease state. This method includes monitoring the progress of a treatment of a disease using a confocal microscope to observe changes over time of an infected area.

One recent approach to ease these problems, described in U.S. Pat. No. 5,770,441, permits the growth of a culture of microorganisms, such as fungi, in a closed system so that the microorganisms may be viewed at any time under a microscope through a slide system apparatus without interrupting the growth of the microorganisms. This enables an operator working with the culture to view the growing fungi (or other microorganisms) on a daily basis without disturbing the growing fungi in any manner until the fungi have grown to a stage where they can be properly identified; i. e., until they have formed the reproduction bodies known as conidia, which will permit their proper identification and diagnosis. At this stage, the operator can properly identify and diagnose the fungi by placing the slide system apparatus on a microscope, and viewing the growing fungi through the slide system apparatus. This approach is exemplary of conventional methods for identifying microorganisms but suffers the disadvantage of being very time-consuming.

Unfortunately, the rising demand for diagnosing fungal pathogens has exacerbated this situation and tremendous demands are placed on a limited availability of board certified dermatologist. Further, it is becoming important for businesses considering capital expansion to new property or certifying an existing work area to be free of fungal pathogen. Generally, it is best to examine a fungus microscopically when the culture first begins to grow and forms conidia or spores, and again a few days later. In many instances, the manner of conidiation or sporulation, which is critical to the correct identification of the fungi, is obscured in old cultures. Further, many fungi are polymorphic and, therefore, observation of the fruiting bodies as they grow is essential. Such observation is not possible in-situ with currently-existing methods for growing cultures of fungi.

U.S. Pat. No. 6,005,964 discloses a system for automatically detecting the presence of contaminants in samples. The system includes a microscope, a controllable stage positioner for holding slides under the microscope, a computer for controlling the stage positioner and a digital camera to capture images through the microscope. The system scans microscope views of regions of a slide sample and provides the digital images to a computer. Image processing routines stored in the computer analyze the digital images and determine whether these images may contain certain contaminants by comparing the characteristics of the objects in the image with the known characteristics of the contaminants.

U.S. Pat. No. 5,859,700 discloses a digital imaging spectrophotometer configured for the direct determination of the ground state absorption spectra of microscopic samples from approximately 400 nm to approximately 950 nm at 2 nm resolution with approximately 1 micron refraction limited spatial resolution. The instrument also uses image processing techniques to identify features, such as a single microbial cell, on a microscope slide or thin section.

It can therefore be seen that available examination techniques sacrifice accuracy of identification for speed or speed for accuracy of identification. Furthermore, the most accurate method, the slide culture method, does not allow in situ viewing.

American Journal of Clinical Pathology 111 (6), p 792-795 June, 1999, defines telepathology as the practice of pathology at a distance using video-microscopy and telecommunication tools. It mentions the use of "virtual microscopy" techniques and the Internet as tools for tele-pathology gastrointestinal biopsy consultations. Gastrointestinal biopsy specimens were photographed using a high-resolution digital camera, a light microscope, and a microcomputer. Digital photomicrographs collected at 40× or 100× optical magnification using 2,700×3,400 pixel resolution were saved in a JPEG image format. Such images could be magnified digitally up to 600% without visible degradation and scrolled at different magnifications on a video monitor, simulating examination under a light microscope. The image files (281 to 3,324 KB) were attached to e-mail messages containing patient information and sent through the Internet to Michigan for interpretation using a Macintosh™ computer.

Mycopathologia Journal 118 (2), 1992, 65-69, describes a system for the evaluation of antifungal activity of volatile compounds based on dynamic growth of a single hypha. The system is composed of a reaction vessel under a microscope, an automatic stage, a charge coupled device camera, a TV monitor, a video tape recorder, and a microcomputer. A fungus was inoculated in the reaction vessel containing agar medium and then was treated with an antifungal reagent in the gas phase either in batch or flow reaction manner. The apex of a growing hypha displayed on the TV monitor was followed automatically. From the ratio of the growth rate under exposure of a reagent (UBXPO) to the growth rate before the exposure, the antifungal activity was expressed quantitatively.

A solution to the shortcomings of existing systems has heretofore been impeded because of the lack of sufficiently accurate microscopic techniques that would provide for on-site examinations for fungal pathogens enabling board certified dermatologist to make fungi examinations on-site at remote locations.

SUMMARY OF THE INVENTION

The present invention provides a system for on-site detection at remote locations of various microscopic contaminants in samples without requiring use of growth media or involving extensive testing methodologies. The present invention enables persons of ordinary skill in focussing a microscope to obtain photomicrographs of samples at a sufficiently high level of resolution so that microscopic contaminants may be correctly identified by a certified mycologist, microbiologist or diagnostician. The present invention furthermore provides for electronic transmission of remotely acquired high-level resolution photomicrographs to a certified mycologist for rapid and/or "real time" analysis. The present invention achieves these and other objects by provided a complex microscope lens system with an television tube and digital video camera attached, an special high intensity lighting system, a computer connected to the camera to receive digital images of samples, and an electronic interface to image transmission means to transmit such images to laboratories where they may be analyzed by a certified mycologist or other technically trained personnel.

DETAILED DESCRIPTION OF THE PREFERRED EMBODIMENTS

The terms "fungus" and "fungi" as used herein means any of a group of eukaryotic protists, including, but not limited to, mushrooms, yeasts, rusts, molds, smuts, dermatophytes, etc., which are generally characterized by the absence of chlorophyll, and by the presence of a rigid cell wall composed of chitin, mannans and, sometimes, cellulose. They are usually of simple morphological form or show some reversible cellular specialization, such as the formation of pseudoparenchymatous tissue in the fruiting body of a mushroom. A mold is any of the various fungal growths which degrade organic matter. Mildew is a superficial coating or discoloring of organic materials such as cloth, leather, vapor, paint and etc., that is caused by fungal metabolic activities. Mildew usually occurs in damp conditions. Microparticles can be inorganic (e.g. insulation material like fiberglass), organic or combination materials such as asbestos tainted fertilizer.

Figure 1:
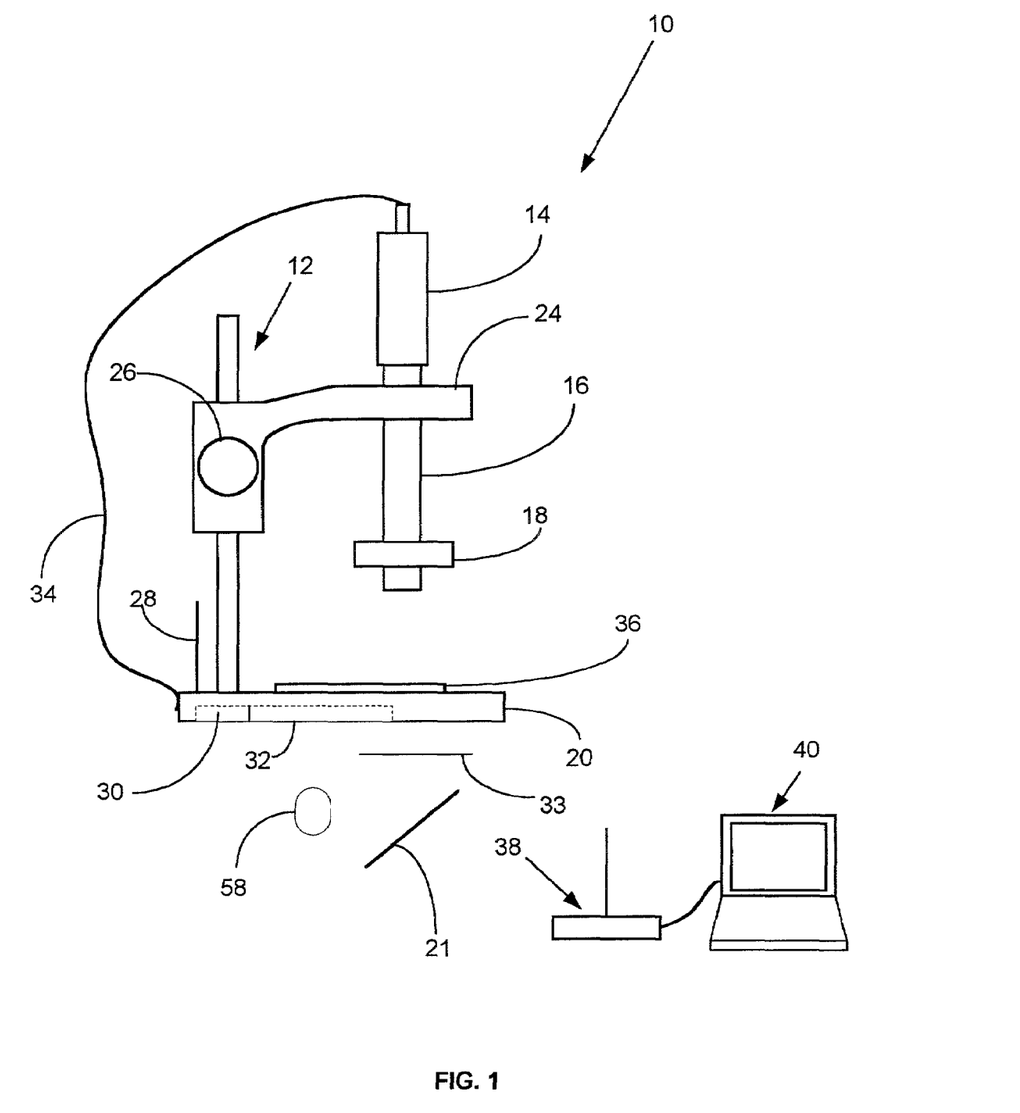
FIG. 1 is a schematic illustration of the apparatus for diagnosing pathogenic or allergenic microorganisms or microparticles at a remote location of the present invention.

FIG. 1 is a simplified schematic of a Digital Diagnostic Imaging System 10 (Digital DIS-10, hereinafter) of the present invention comprising a microscope stand 12, a digital camera 14, a high-resolution lens magnification system 16 and an associated high-intensity lighting system 24. Microscope stand 12 comprises a conventional base 20 having a vertically oriented focussing post 22 which supports a horizontally extending microscope arm 24. Arm 24 is attached to focussing post 22 having a conventional focussing knob 26 adapted to provide vertical movement to microscope arm 24. A conventional X-Y positioning system 36 adapted to secure samples and provide X-Y movement in the horizontal plane is also located on base 20.

Important features of DIGITAL DIS-10 include a transmission antenna 28 projecting upwardly through an opening in base 20 from a transmitter 30 integrated into an operating circuit board 32, both in dashed lines, also connected to digital camera 14 via cable 34. DIGITAL DIS-10 also provides for a receiver 36 linked to a PC-style laptop computer 38 having therein an image storage device such as a hard disk drive, an image display and a modem adapted for connection to conventional telephonic long-lines having suitable bandwidth for image transmission.

Digital cameras 14 are known in the art and are available from a number of sources including Scaler, the DG-1 Portascope™ model, Hitachi, the KPD-8 model, Sensor Technologies Sentech 630 AS model, and the like. Laptop computers 36 having the features identified above are also readily available from a number of sources including Compaq, IBM and Toshiba. The capability to transmit photomicrographs captured by DIGITAL DIS-10 is available from and number of ISP companies using World-Wide-Web Internet connections.

Imaging Systems that Failed

A first attempt to devise a satisfactory DIGITAL DIS-10 system was made using a commercially available Swift field microscope having a Scaler digital camera, model DG-1 Portascope, attached to a conventional microscope. This system failed due to the poor resolution of the digital camera attached. The pictures were blurred to the extent it was not possible to determine what images were captured even when using 1000 power magnification.

A second attempt was made using the Scaler DG-1 Portascope camera with microscope lenses attached directly to the camera. These images were too small to identify, and the lenses had to be in direct contact with objects to be identified. This was unsatisfactory in terms of the quality of the images and also in terms of viewing the objects from a distance of approximately one-inch, between the lens, and the object attempted to view.

A third attempt to manufacture a special, high resolution lens system was a complete failure. High resolution lenses were purchase from Melles Griot a manufacturer of high quality microscope lenses but the lenses could not be adjusted to reamin in synchronization with a Hitachi KPD-8 digital camera. The pictures could not be focussed, and the images were too small to identifying images observed.

A final attempt used a lens set manufactured by Optem International (Optem 1.0× mini TV tube part # 29-90-90, Optem 1.5× auxiliary lens part #29-20-13), a lens manufacturing company. The lenses did not provide sufficient magnification or resolution to see the objects trying to identify.

Dental or endoscopic camera systems such as those disclosed in U.S. Pat. Nos. 4,858,001, 4,994,910, and 5,124,797 were considered. However, issues with resolution, user training and sample preparation made the use of such systems time intensive, costly, and created an overall decrease in user flexibility.

Example 2: Successful DIGITAL DIS-10 Imaging Systems

Subsequent to the above described failed attempts to provide a operationally satisfactory DIGITAL DIS-10, it was determined that an improved special lens system would be required, including the addition of a zoom feature in order to create images of sufficient clarity, resolution and magnification that would allow capture at remote locations by relatively unskilled personnel. In addition, it was determined that a unique lighting system would be required to illuminate targets with sufficient clarity, resolution and magnification.

Figure 2:
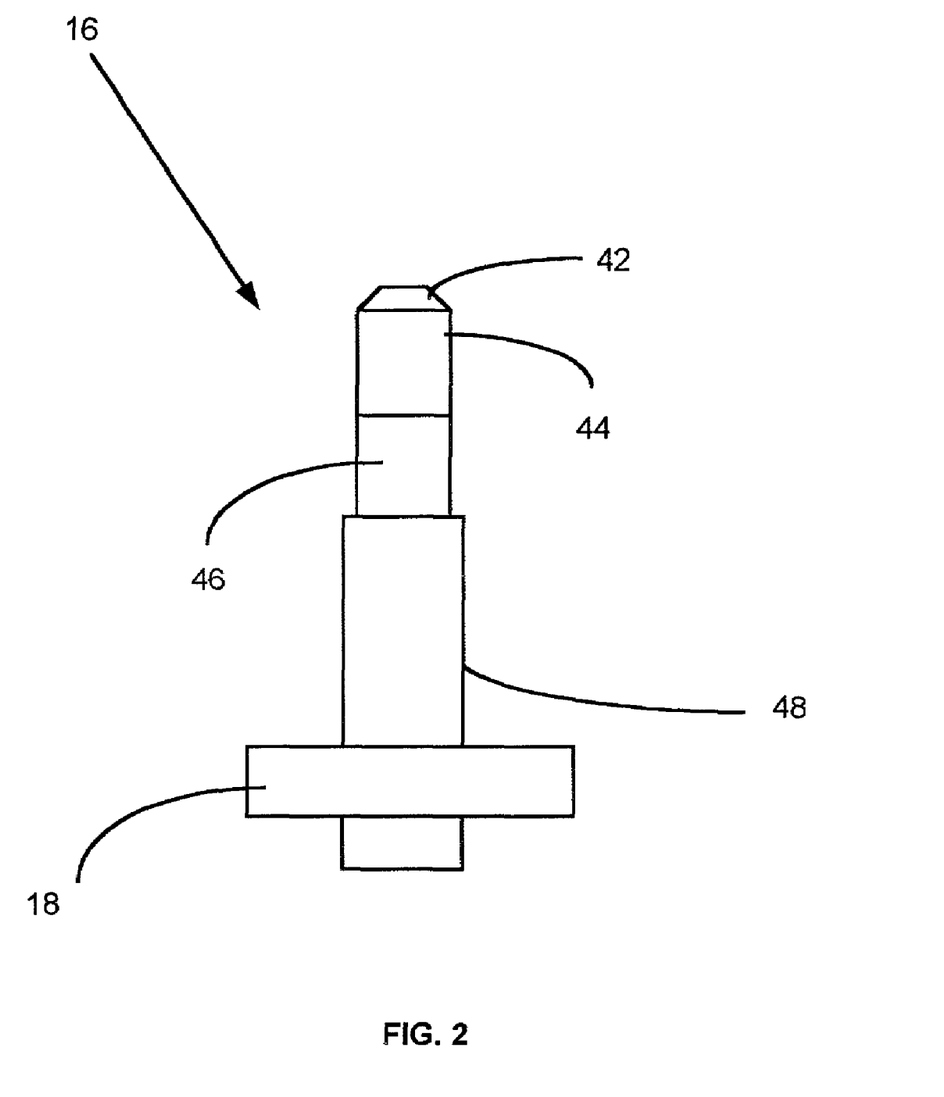
FIG. 2 is a elevation drawing of a high-resolution lens magnification system useful in practicing the invention of FIG. 1.

The high-resolution lens magnification system 16 illustrated in FIG. 2 and which provides the magnification and resolution necessary to achieve the objects of the present invention was not available commercially and therefore had to be created to certain specifications, including:

Glass pickup lens 42

2× power television tube 44, to allow the lens to be used with a digital camera.

2.0× to 3.0× power auxiliary lens 46 below the TV tube

Zoom 70×2 lens 48 with modified fine internal focus and an optional iris diaphragm;

the iris being optionally employed only if an adjustable light source diaphragm is not available.

When all lenses in lens magnification system 16 are assembled, the resulting lens magnification system 16 is approximately 1.5 inches in diameter, round in shape and approximately 8 inches long.

A satisfactory digital camera 14 useful in the DIGITAL DIS-10 is manufactured by Hitachi Denshi model KD-P8. The camera 14 is available as either a color or black and white video camera, approximately 3.5 inches long, rectangular in shape and approximately 0.75 inches wide Eacross each of the four sides. Alternately, the Sensor Technologies Sentech 630 AS model, having both color and gain adjustments, has been found to provide exemplary performance for digital camera 14. Obviously, other qualified digital cameras would be useful providing that selection of digital camera 14 provide the quality of the images produced, versatility in terms of lenses that can be attached, and size, which must to be small enough and light weight enough to allow its mounting on a remote controlled vehicle, allowing access to air conditioning ducts and other small areas. The digital camera 10 resolution and sensitivity are also critical and the KD-P8 provides 470,000 pixels by 870,000 pixels.

An exemplary microscope stand 12 selected for the DIGITAL DIS-10 is available from Meiji Techno America (Meiji Techna 8 inch P stand) and has the following characteristics.

Stand 12 is an 8-inch adjustable microscope stand with a vertical adjustment on a worm gear. The adjustment vertically is 8" up or down.

The lens holder portion 24 is also adjustable 360 degrees on a vertical post, and can be locked in any position of the 360 degrees.

The area that holds the actual lens and camera system is a 3.5 inch diameter loop, that is part of the vertical adjustment portion, attached to the vertical post.

The loop was designed originally to accommodate a traditional microscope body with lenses.

Figure 3:
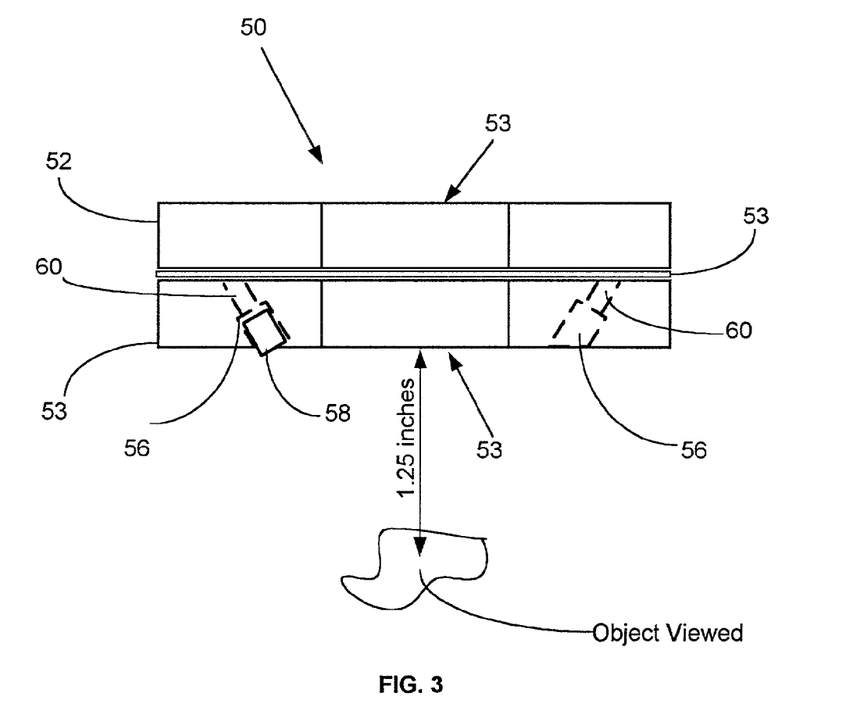
FIG. 3 is a elevation drawing of a high-intensity lighting system useful in practicing the invention of FIG. 1.

As no commercially available lighting system was available providing the degree of illumination as required to provide the resolution required by the DIGITAL DIS-10 system, high-intensity lighting system 24 seen in FIG. 3 was developed. Lighting system 24 is critically designed to provide sufficient lighting on the objects being imaged to allow for accurate subsequent analysis. In an exemplary embodiment, the lighting system 24 comprises a light ring 50 made of aluminum in two pieces, a top section 52 and a bottom section 54, both pieces having a 1.3 inch hole 53 in the center to allow them to slip onto the bottom of the lens system 16. The outside diameter of the ring 50 is 3 inches, and a set screw (not shown) is in the bottom section 54 allowing it to be attached to the lens system 16. The bottom section 54 provides at least one and as many as 3 light sockets 56 (only two are shown in dashed lines) that are counter sunk to a precise depth, and set screws (not shown) to hold light bulbs 58 in place in ring 50 to accommodate light bulbs 58 at a specific angle of illumination to allow the focal point of the bulbs 58 to be in a range between about 0.5 to 1.50 inches from the object being viewed. As is known in the art, typical microscopes require extremely close positioning of the microscope lens near the object being viewed; it should be apparent to the reader that a separation in a range about 0.5 to 1.50 inches between the focal point of illumination from bulbs 58 and high-resolution lens magnification system 16 provides a vastly improved freedom of operation. Alternate light sources may be employed and positioned in other locations including a lens source that projects illumination from beneath and upwards through the target as long as the focal point of the bulbs 58 is removed in a range between about 0.5 to 1.50 inches from the taraet object being viewed. The bottom section 54 also provides the negative electrical contact to operate the light bulbs 58. As mentioned the light ring 50 is aluminum and electrical current passes through the body of the ring 50 to the electrical contacts of the bulbs 58. The bulbs 58 are counter sunk to a specific depth and then a smaller hole goes 60 through the bottom portion of the ring, so that the positive contact on the bulb extends through the bottom ring ³⁄₁₆ of an inch. The bulbs 58 have a plastic body so as not to allow electrical short circuits between the two sections 52 and 54 of ring 50. The top section 52 provides the positive electrical contact for the bulbs 58, and when the top section 52 and bottom section 54 are screwed together there is a gasket 53 is provided separating the two top section 52 and bottom section 54 so that an electrical short circuit does not occur. The top section 52 has a beveled edge on the inside of the ring 52, and when the top section 52 is attached to the bottom section 54 the contact is made on the positive side of the bulbs 56 with the top section 52. There is a power wire attachment hole drilled in the side of top section 52 and bottom section 54, and this allows a wire to be attached to top section 52 and bottom section 54 and thereby to circuit board 32 that provides regulated power to the light ring 50. Another embodiment is seen in FIG. 1 in which a illumination bulb 58 is positioned below the object being viewed so as to illuminate from beneath the lens focal plane. Illuminating radiation from bulb 58 may be enhanced by means of a mirror 21 to increase the amount of radiation incident and/or by means of a filter 23 also disposed beneath the object being viewed.

Figure 3A:
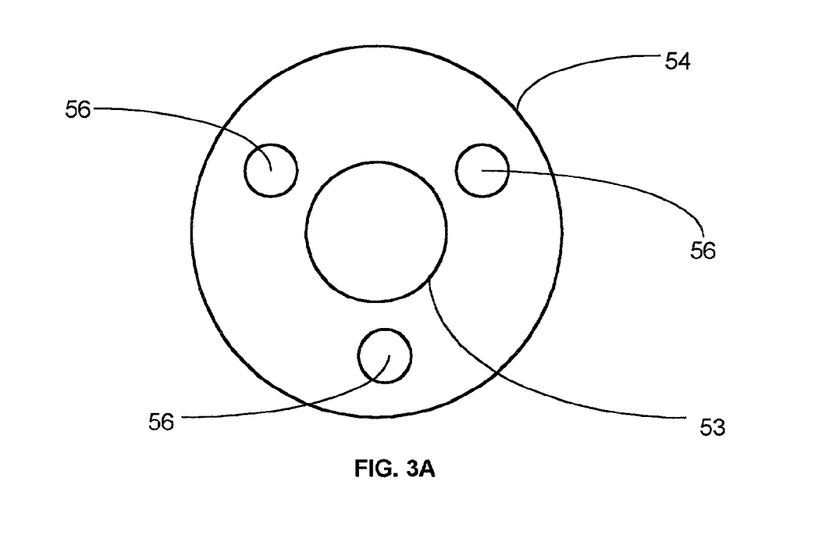
FIG. 3A is a bottom view of the lighting system of FIG. 3.

The bulbs 58 used in lighting system 50 are commercially available from Browning Corporation, identified as Lightning Bug lamps, #3744002; what is important about such lamps bulbs 58 is the ability to produce the required level of high intensity illumination. Bulbs 58 are xenon high intensity bulbs, and have a reflecting mirror surrounding the bulbs. As mentioned previously, it is critical that the bulbs 58 be positioned so that when the lens is in a range between about 0.5 to 1.50 inches from the object being viewed, all of the bulbs or bulb 58 are also focused on the object being viewed. As the vertical adjustment of the lens magnification system 16 is increased, the lighting illumination pattern spreads out to make three separate spots of light. As seen in FIG. 3A, a underside view of bottom section 54, in the event of three light sockets 56, the sockets 56 are equally distributed around the perimeter of ring 50.

In order to provide a constant level of output light from lighting system 24, a special electrical power circuit board 32 was designed to provide regulated power of different voltages and amperages to the high-intensity lighting system 24, the digital camera 14, and a wireless transmitter 30. These regulating mechanisms are attached to the circuit board 30 and further attached to a metallic base plate and/or plastic cover located underneath the microscope base 20. The regulating mechanisms are installed on the circuit board to provide precisely 12 volts of dc current into the circuit board through a plug-in module in the back of the microscope base. Thusly, a preferred circuit board was created to provide the voltage and ampere necessary to operate the bulbs in high-intensity lighting system 24 regardless of the number of bulbs employed without burning them out prematurely. The circuit board consists of a transformer, transistors, voltage regulators, diodes, dimmer switch, and resistors, wired in a configuration to allow voltage regulation for the lighting system 24, the camera, the transmitter and the dimmer switch.

The DIGITAL DIS-10 is powered with 12 volts dc, and the regulator on the circuit board 30 for the camera provides this voltage. A plug-in module for the camera 14 is at the back of the microscope base and a wire from the plug-in goes to the camera 14. Various commercially available digital cameras 14 including those sold by Sentech and Hitachi are designed to operate from a voltage reducer inserted into a 110-volt outlet. The transmitter 30 also requires 12 volts, and this operating voltage is provided from circuit board 32. The transmitter 30 is attached directly onto the microscope base and a hole is drilled through the microscope base allowing the antenna 28 to protrude from the base. The power is directly wired to the circuit board 32. The power for the high-intensity lighting system 24 is reduced to 3 volts and a maximum of 2.5 amperes. There is also a voltage/ampere adjustment knob located in the side of the microscope base. This is used to reduce the light when needed, and eliminates the need for an adjustable iris diaphragm in the lens set.

Figure 4:
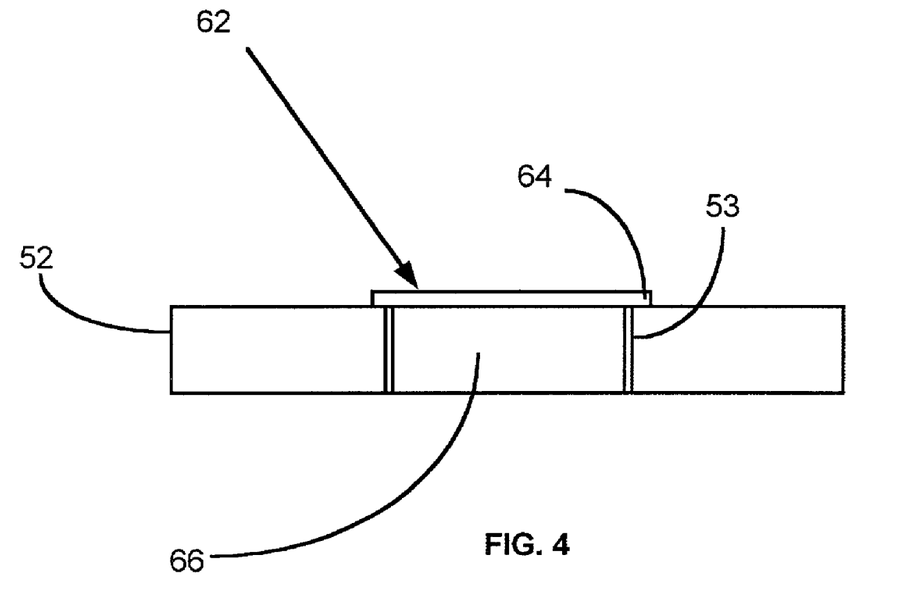
FIG. 4 is a elevation drawing of a lens mounting disc useful in practicing the invention of FIG. 1.

The digital camera 14 and lens system 16 are mounted using an inverted L-shaped aluminum lens mounting disc 62, seen in FIGS. 4 and 4A, that slips into the 3.5-inch holes 53 in top section 52 and bottom section 54. Disc 62 has a ¼-inch thick "top leg" 64 to prevent sliding through hole 53. A hole is drilled to accommodate a set screw to secure disc 62. An opening 66 in the center of the disc 62 is sized to accommodate lens system 16, and another set screw attaches the lens system 16 to the disc 62. With the disc 62 attached to the focussing post 22 and focussing knob 26, and the lens system 16 and digital camera 14 attached to disc 62, the lens system 16 is firmly secured in a matter to allow vertical and 360-degree adjustments.

Fungal spores and microparticles are frequently collected by an air-sampling mechanism. The air sampling technique operates on the principle of inertial impaction. Particles in the airstream are drawn through a slit of an air-sampling apparatus and directed to a sticky surface at a flow rate of approximately 10 to 15 liters per minute. The particles (for example, mold spores) become lodged onto the adhesive surface of the glass slide. The sample is stained, magnified 1,000 times and analyzed for the presence of fungal spores with a microscope. If digital camera 14 is equipped with appropriate filter and color controls, for example like with a Sentech 630 camera, sample staining is not necessary. If necessary, air samples may be taken using an air sampler like that available from Allergenco LLC (Allergenco Air Sampler model MK3), a programmable unit that captures airborne particles on a slide coated with a silicone grease/hexane solution. The unit is programmable to control the length of time particulates are collected on the slide, as well as the time between samples. Air samples from hard to reach areas, like between walls, may be taken with minimal wall damage using an adapter added to the to the usual Allergenco air sampling inlet; the adapter is typically a flat plastic piece with a through-hole attached to the air sampling inlet on one side of the piece and to an elongate hose on the other side of the piece. The hose may be inserted into a relatively small hole drilled through wall structures to reach otherwise trapped areas. The unit is capable of taking 24 sample traces on a slide over a 24-hour period, at varying sample durations. Once the slide has collected the particulates, a stain may be applied depending on the material being observed for identification and when a digital camera without appropriate filter and color controls is employed. For example, Cabellera's stain is used for pollens, and methyl phenol cotton blue is used for molds.

Minimal Training Required for Using DIGITAL DIS-10

The first step in the training process is providing an operator with various skills. The laptop computer will have a word processing program and image capture software such as that allows the operator to capture the images. The computer also has software that allows access to the Internet and the ability to send the images via email to our web site. Training an operator to use the laptop and the software takes approximately 3 hours, and involves examples and report forms that simulate operation in remote locations.

The next training step is instructing the operator in proper use of the camera system. This requires 3 hours of to teach set-up and operation on a portable battery-operated basis and also using conventional 120 voltage when available. The training includes focussing the camera and positioning high-intensity lighting system 24 proximate the sample depending on the type of sample viewed, using image capture software, capturing the image, and sending the captured image to the lab.

The operator also learns to obtain samples using adhesive tape lift methods. This method involves pressing a piece of clear tape against a suspected mold infestation and attaching the tape to a laboratory slide. The slide is stained with the appropriate stain and placed on the microscope base for examination. The captured images may be transmitted from the camera to the computer in either a wireless or wired mode and the focusing of the image occurs at the lens set. Once a clear image is obtained, the image capture software is used to capture the image so it may be sent to the lab for identification and/or enumeration. The image may be identified by an operator on a form previously filled and sent to the lab, providing information identifying a client and the location where the sample was taken.

Other types of samples include a cotton swab, bulk samples such as ceiling tiles, carpeting, or wood. For example, a wetted cotton swab can capture mold, bacteria or other microorganisms by physical contact; these microorganisms can be suspended into a liquid water solution that can be poured onto a glass slide and imaged directly using DIGITAL DIS-10 on the slide in either a wet or dried state. Air samples must first be captured using an air sampler as part of the identification process, requiring an additional three hours of training. At the laboratory, a qualified mycologist or trained technician views the images sent in by the operator and reports back via the same e-mail to the operator to confirm a successful analysis. At that point the operator can print out the lab report on site and give it to his client.

Exemplary Examples Using DIGITAL DIS-10

In general, whenever an operator is called to inspect a remote house or building, the operator inspects the house for evidence of mold contamination. If an operator sees what appears to be mold on a moist wall wet, he sets up the DIGITAL DIS-10 system, using either battery operation or 110-volt power with a power adapter when convenient, and obtains a swab sample of the suspected mold. The operator brings swab to the DIGITAL DIS-10 system, employs high-intensity lighting system 24 in an appropriate illumination position relative to the sample depending on the type of sample viewed and makes an initial focus by adjusting the vertical portion of the microscope 12 until he/she appears to see a single light spot on the monitor portion of PC computer 16. He/she then focuses the lens system 16 using either the coarse or fine adjustments on the zoom lenses 48. Once this is focused the operator then zooms on the image using the zoom feature of lens 48. Another fine focus may be required at this point. Using the previously described lens system 16, image magnifications in the range of about 182× to 1282× have been obtained however it is apparent to one skilled in the art that even greater magnifications are possible using higher powered pickup lens 42, television tubes 44 and/or power lens 46 so that a higher powered macroscopic lens system 16 is provided. As is known in the art, typical microscopes require extremely close positioning of an operator's eyes near an microscope focussing eyepiece lens that might well be difficult to achieve in such remote locations; it should be apparent to the reader that focussing the lens system 16, without relying on a focussing eyepiece lens, instead using the monitor portion of PC computer 16 provides a vastly improved ease of and speed of operation. Once the zoomed image is clear on the monitor portion of PC computer 16, a digital picture is taken using camera 14 and sent from PC computer 16 via ISP internet services to a qualified lab for identification. The swab may or may not have to be stained, and if the images are ambiguous, an adhesive tape slide may be necessary. This is only possible because the high-intensity lighting system 24 and lens system 16 are mutually adjusted to provide an optimum amount of light for the camera and for the lenses. In a particularly important embodiment, when the sample viewed is illuminated from beneath with a single bulb 58 of the previously identified Browning Lightning Bug lamps and a blue filter 23 is interposed between the sample and the bulb 58 as seen in FIG. 1, microorganisms like those shown in FIG. 6 have been identified without requiring the use of traditional stains.

Using the above exemplary camera system lenses and lighting system elements of DIGITAL DIS-10, it was possible to take still images of molds, pollens, and bacteria, and various fibers. (See FIGS. 5 and 6, described later.) The resolution was excellent and allowed direct identification of various species of fungi, pollens and fibers, including fiberglass and some species of asbestos. Slides collected from various locations have been used to identify the following molds and pollens: Molds, Stachybotrys, Fusarium, Penicillium, Cladosporium, and *Aspergillis Niger*. Pollens, Oak, and Dogwood. Samples were also identified from an air sample, pet dander, animal hair, ordinary dust, and fiberglass insulation.

In particular, on Feb. 2, 2000 at 3:30 PM, the DIGITAL DIS-10 system was tested using the lens system 16 and digital camera 14, at a remote location in Cameron Park, Calif. At the site, swabs of two areas were taken outside the house that was suspected of having mold.

The first sample was taken on the underside of a board adjacent the house, the second sample was taken from the underside of a pallet, also adjacent the house. Slides were prepared using the swabs and number 1.5 cover slips were used to cover the swabbed area on the slides. Digital images of the slides were taken and transferred to the laptop computer 40. The images were then sent to CLS labs in Rancho Cordova, Calif. via the Internet over a telephone line. The images were enhanced and sent to Micro Test Labs in Sacramento, Calif. for identification by a mycologist. The mycologist confirmed that the organisms on the slide were indeed mold and easily identified the molds on each of the slides as being the mold penicillin.

Figure 5:
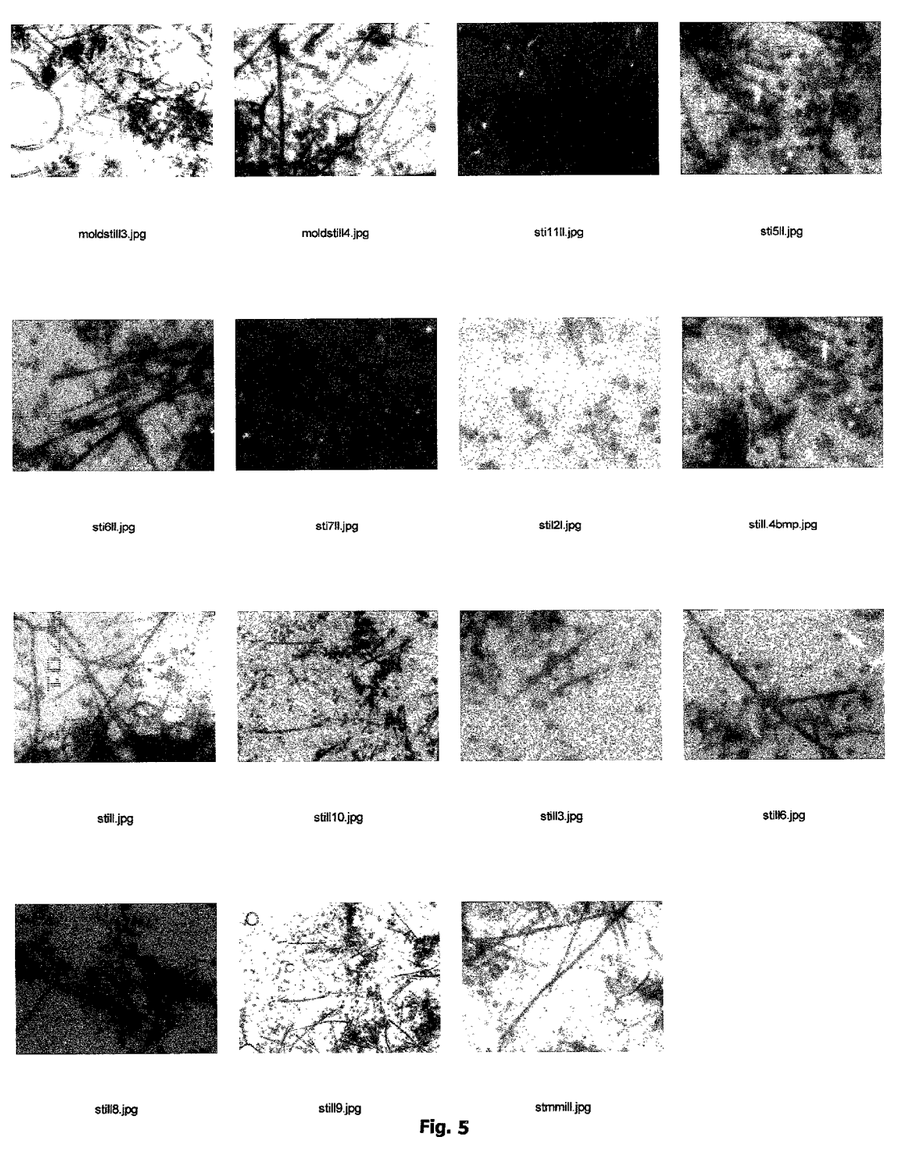
FIG. 5 is a colored photomicrograph of a number of different molds identified using the invention of FIG. 1 on a stationary support; and, FIG. 6 is a colored photomicrograph of a number of different microparticles identified using an alternate hand-held embodiment of the invention of FIG. 1.

Using DIGITAL DIS-10, it was also possible to identify molds by placing a piece of carpet or a ceiling tile below the lens area. Any object that is contaminated with mold can be directly viewed. A key advantage of DIGITAL DIS-10 is that it is not necessary to prepare a slide to identify fungi as traditional systems do. In addition, as the DIGITAL DIS-10 system is adjustable from side to side, it may be laid on its side to view a wall or simply move the lenses to the side and directly view a carpet or floor. Consequently, DIGITAL DIS-10 has been used to identify fungi directly from a cotton swab that has been wiped across a mold infestation without the preparation of a slide. At the locations listed above, samples were collected using cotton swabs, and *Stachybotrys, Penicillium, Cladosporium, Fusarium*, and *Aspergillis Niger* were identified without use of conventional slides FIG. 5 is a colored photomicrograph of a number of several different molds identified using the DIGITAL DIS-10 in the configuration of FIG. 1. In this instance, DIGITAL DIS-10 is positioned on a stationary support and samples to be identified are presented on a microscopic slide but without the presence of any growth media. Using only the microscope stand 12, digital camera 14, high-resolution lens magnification system 16 and high-intensity lighting system 24, DIGI- TAL DIS-10 was successfully able to provide on-site detection at remote locations of various molds in samples without requiring use of growth media or slides or involving extensive testing methodologies. DIGITAL DIS-10 thereby enables persons of ordinary skill in focussing a microscope to directly obtain photomicrographs of such samples at a sufficiently high level of resolution to permit such molds to be correctly identified by a certified mycologist, microbiologist or diagnostician.

Figure 6:
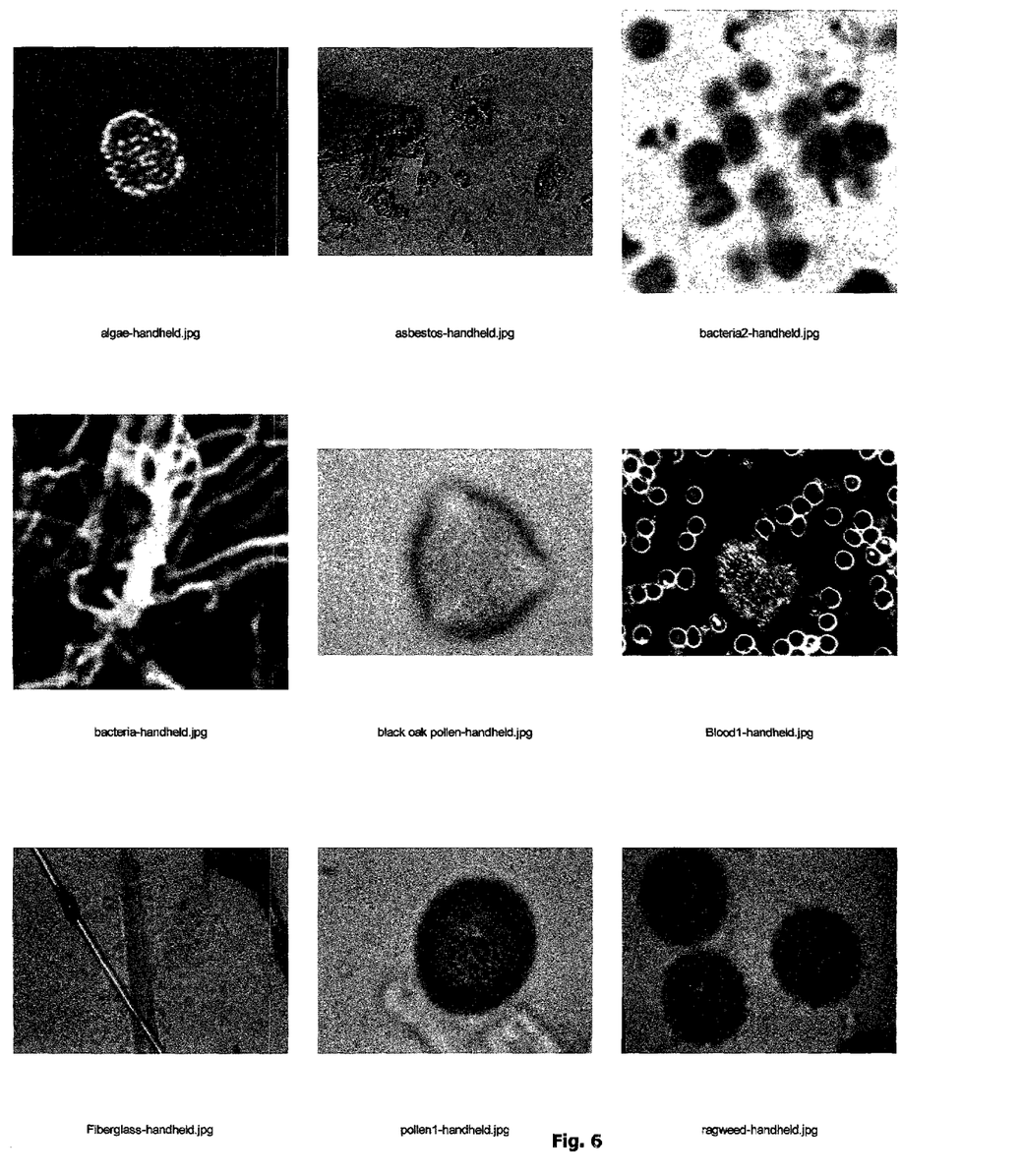

FIG. 6 is a colored photomicrograph of a number of different microparticles identified using the invention of FIG. 1 in an alternate hand-held embodiment in which the digital camera 14, high-resolution lens magnification system 16 and high-intensity lighting system 24 are removed from microscope stand 12 and held in the hands of an operator directly over or in an equivalent position to illuminate the microparticles to be identified, for example on walls, under doors, underneath homes, etc. In this alternate embodiment, DIGITAL DIS-10 again enables persons of ordinary skill in simply focussing a lens to obtain photomicrographs of various microscopic contaminants like asbestos, pollen, fiberglass, ragweed, etc., at a sufficiently high level of resolution to permit the contaminants to be correctly identified by a certified mycologist, microbiologist or diagnostician.

The DIGITAL DIS-10 system is also capable of recording moving images. For example if an air sample was taken on a slide or other collection apparatus, it is possible to move the slide across the viewing area and identify the molds or pollens or fibers that were collected, so they may be enumerated. Enumeration is important in determining whether or not a mold is growing inside a building. By comparing air samples taken outside a building with samples taken inside a building, it is possible to ascertain if more spores are inside than are outside; in such an event, it may be concluded that spores are growing inside the building. The DIGITAL DIS-10 system is completely portable and self-contained operation is possible when electrical power is not available. The DIGITAL DIS-10 system operates on a 12-volt dc battery system or it can be operated using a standard voltage reducer that reduces electrical voltage from 110 volts ac to 12 volts dc. Because the DIGITAL DIS-10 system is completely portable and self-contained, and because the lens and camera system are easily removed from the microscope stand, it is possible to attach the DIGITAL DIS-10 system to a remote controlled vehicle and send the DIGITAL DIS-10 system into air conditioning ducts or beneath a house or into an attic using the battery power operational mode.

DIGITAL DIS-10 System Communication in a Wireless Mode

In an exemplary operation, digital camera 14 relays the image information captured using an appropriate signal cable then via transmitter 30 (Micro Video Products MV915VTX transmitter) to receiver 38 (Micro Video Products MVRX402 receiver) linked to a laptop computer 40 (Arms laptop generic 600 megahertz) using a USB cable (Toplink USB-500VD) or equivalents thereof. The mycologist or microbiologist is thus able to review the image on the laptop's monitor on a real-time basis or the images can be captured and saved in either JPEG/bitmap or MPEG/AVI format and can be compressed, if desired. The mycologist or microbiologist can then view the images using any image viewing utility (e.g. Paint Shop Pro, Corel . . . etc) at a latter time.

DIGITAL DIS-10 System Communication in the Internet Mode

IN another embodiment, digital camera 14 relays the information using a modified Hitachi cable (KDP-8) via transmitter 30 (Micro Video Products MV915VTX transmitter) to receiver 38 (Micro Video Products MVRX402 receiver) linked to a laptop computer 40 (Arms laptop generic 600 megahertz) using a USB cable (Toplink USB-500VD). The laptop computer 40 captures the still or video images using Microsoft AV Recorder software. The file or files are saved in either JPEG/bitmap or MPEG/AVI format and can be compressed, if desired. The Internet is accessed via modem within computer 40. The files are then sent as e-mail attachments (e.g. Microsoft Outlook) or via transmissions to a secure website. The mycologist or microbiologist can then view the images using any image viewing utility (e.g. Olympus Campedia Master, Paint Shop Pro, Corel . . . etc.)

What we claim is:

1. A method for making possible the identification of various microscopic contaminants in samples by certified personnel in a laboratory by:
   using a person semi-skilled in focussing a microscope to obtain photomicrographs of said samples collected in their original, natural environment without the use of a culturing agent;
   electronically transmitting said photomicrographs to the laboratory; and,
   identifying the microscopic contaminants in less than 24 hours by a skilled mycologist or other certified person, wherein said microscopic contaminants do not comprise plant anomalies, and wherein said identifying is completed without requiring use of growth media and further wherein the photomicrograghs are captured using a non-commercial lens system comprising the combination of a glass pickup lens, a 2× power television tube, a 2.0× to 3.0× power auxiliary lens and a zoom 70×2 lens with modified fine internal focus.

2. The method of claim 1 wherein said steps of employing, transmitting are completed "real time".

3. The method of claim 1 wherein the photomicrographs are captured directly from pieces of carpet or ceiling tile or cotton swabs.

4. The method of claim 1 wherein the microscopic contaminants are fungal spores and the photomicrographs of the spores are taken on a glass slide from an air-sampling mechanism.

5. The method of claim 1 wherein the photomicrographs are obtained using a digital camera by a semi-skilled person, the camera being positioned directly over the microscopic contaminants to be identified.

6. The method of claim 5 wherein the digital camera has a image capture resolution of at least about 400,000 pixels by 800,000 pixels.

7. The method of claim 1 wherein the photomicrographs are obtained using a digital camera operated by battery power and transported by a remote-controlled vehicle into air ducts or beneath building structures.

8. The method of claim 1 wherein the microscopic contaminants remain in their original natural environment during analysis so as to eliminate adulteration of the contaminants during transportation to a laboratory and so as to avoid introduction of contaminants into said laboratory.

* * * * *